(12) United States Patent
Niemi et al.

(10) Patent No.: US 8,665,716 B2
(45) Date of Patent: *Mar. 4, 2014

(54) ENABLING CIRCUIT-SWITCHED SERVICES DURING MOBILITY MANAGEMENT CONGESTION CONTROL

(75) Inventors: Marko Tapani Niemi, Oulu (FI); Ilkka Mikael Heikkinen, Oulu (FI)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,375

(22) Filed: Jan. 10, 2012

(65) Prior Publication Data

US 2012/0294144 A1    Nov. 22, 2012

Related U.S. Application Data (63) Continuation of application No. 13/111,166, filed on May 19, 2011.

(51) Int. Cl.
*H04W 24/02* (2009.01)
(52) U.S. Cl.
USPC ............................. 370/230; 370/329; 370/322
(58) Field of Classification Search
USPC .................................................. 370/230, 329
See application file for complete search history.

(56) References Cited

U.S. PATENT DOCUMENTS

| 2005/0261017 | A1* | 11/2005 | Vaittinen et al. | 455/522 |
|---|---|---|---|---|
| 2010/0202368 | A1* | 8/2010 | Hans | 370/329 |
| 2012/0106332 | A1* | 5/2012 | Tiwari | 370/230 |

FOREIGN PATENT DOCUMENTS

| GB | 2 381 164 A | 4/2003 |
|---|---|---|
| WO | WO 2007/083212 A1 | 7/2007 |

OTHER PUBLICATIONS

Search Report for Great Britain Application No. 1 208 424.1, dated Sep. 12, 2011.
3GPP TS 24.008 v10.2.0 (Mar. 2011) Technical Specification; $3^{rd}$ Generation Partnership Project; Technical Specification Group Core Network and Terminals; Mobile radio interface layer 3 specification; Core network protocols; Stage 3 (Release 10) (634 pgs.).
3GPP TSG CT Meeting #51; Kansas City, US, $16^{th}$—$18^{th}$ Mar. 2001; Change Request 24.008 CR 1700 (43 pgs.).

(Continued)

*Primary Examiner* — Man Phan
*Assistant Examiner* — Pamit Kaur
(74) *Attorney, Agent, or Firm* — Alston & Bird LLP (57) ABSTRACT

A method is provided that includes causing transmission of a first mobility management (MM) message from a UE to a core network including packet-switched (PS) and circuit-switched (CS) domains. The method may include causing transmission of the first MM message to a PS-domain component, and receiving a rejection message from the PS-domain component in response thereto. The rejection message indicates congestion as a cause for rejection of the first MM message. In response to receipt of the rejection message, the method may include running a back-off timer. While the back-off timer is running in an instance in which the rejection message indicates that circuit-switched services are permitted, the method may include causing transmission of a second MM message from the UE to a CS-domain component. A corresponding apparatus and computer-readable storage medium are also provided.

25 Claims, 3 Drawing Sheets

(56) References Cited

OTHER PUBLICATIONS

3GPP TS 24.007 v10.0.0 (Mar. 2011) Technical Specification; $3^{rd}$ Generation Partnership Project; Technical Specification Core Network and Terminals; Mobile radio interface signaling layer 3; General aspects (Release 10) (149 pgs.).

"Discussion about Call Attempt Restriction in PS domain;" NTT DOCOMO; 3GPP TSG CT WG1 Metting # 57; Mobile Competence Centre; dated Feb. 24, 2009; retrieved on Feb. 24, 2009.

"Discussion on APN based congestion control;" CATT; 3GPP TSG CT WG1 Meeting #67; Mobile Competence Centre; dated Oct. 11, 2010; retrieved Oct. 4, 2010.

International Search Report and Written Opinion of the International Searching Authority for Application No. PCT/IB2012/052493, dated Oct. 2, 2012.

"NAS level attach reject in 2G-3G;" KPN; 3GPP TSG SA WG2 Meeting #81; Mobile Competence Centre; dated Oct. 11, 2010; retrieved on Oct. 6, 2010.

"NAS level reject pre APN with back-off timer function;" KPN, NTT DOCOMO; 3GPP TSG SA WG2 Meeting #80; Mobile Competence Centre; dated Sep. 3, 2010; retrieved Sep. 3, 2010.

* cited by examiner

ENABLING CIRCUIT-SWITCHED SERVICES DURING MOBILITY MANAGEMENT CONGESTION CONTROL

CROSS-REFERENCE TO RELATED APPLICATIONS

This application is a continuation of U.S. application Ser. No. 13/111,166, filed May 19, 2011, which is hereby incorporated herein in its entirety by reference. This application also claims the benefit of and priority to United Kingdom application number 1108424.1, filed on May 19, 2011.

TECHNOLOGICAL FIELD

Embodiments of the present invention relate generally to wireless communication technology and, more particularly, relate to an apparatus, method and computer-readable storage medium for enabling circuit-switched services during mobility management congestion control.

BACKGROUND

Wireless and mobile networking technologies have been developing at a rapid pace. Driven by consumer demand and fueled by continuous advances in battery technology and the ability to manufacture small and highly capable devices, many advancements have also been made in relation to the production of devices that utilize these developing technologies. These devices are becoming ubiquitous in the modern world and are increasingly being employed for use in communication, gaming, social networking, content generation, content sharing, scheduling and numerous other activities.

While the numbers of devices in the hands of users continue to increase, and the capabilities of the devices to perform complex functions and communicate with other devices also increase, the networks that support these devices may be put under a strain. In this regard, support for processing functions, communication and content sharing requires reliable communication that can be maintained in an efficient manner. As such, there is a continued need to improve network performance to support the devices that utilize wireless communication networks.

BRIEF SUMMARY OF EXAMPLE EMBODIMENTS

Example embodiments of the present invention provide an apparatus, method and computer-readable storage medium for enabling circuit-switched services during mobility management congestion control. According to one example aspect, a method is provided that includes various operations from the perspective of a user equipment (UE). The method includes causing transmission of a first mobility management message from a UE to a core network including a packet-switched domain and a circuit-switched domain. In this regard, the method may include causing transmission of the first mobility management message to a component (e.g., MME/SGSN) of the packet-switched domain. This mobility management message may include, for example, a request to attach to the packet-switched domain, perform a routing area update or receive a packet-switched service.

The method may also include receiving a rejection message at the UE from the packet-switched domain component (e.g., MME/SGSN) in response to the first mobility management message. The rejection message indicates congestion as a cause for rejection of the first mobility management message, and may also include a value of the back-off timer. Consequently, the method may include running a back-off timer (e.g., starting at the back-off timer value) in response to receipt of the rejection message. The back-off timer in this example indicates a time during which the UE defers transmission of any further mobility management messages to the packet-switched domain component.

The indication in the rejection message that circuit-switched services are permitted enables the apparatus to cause transmission of a second mobility management message from the user equipment to a component of the circuit-switched domain (e.g., MSC), while the back-off timer is running. Thus, while the back-off timer is running, the method may further include causing transmission of the second mobility management message from the UE to the component of the circuit-switched domain. In one example, the rejection message may include an indication whether circuit-switched services are permitted or forbidden during running of the back-off timer. In this example, transmission of the second mobility management message may be caused in an instance in which the rejection message indicates that circuit-switched services are permitted.

According to another example aspect, a method is provided that includes various operations from the perspective of a packet-switched domain component (e.g., MME/SGSN). The method of this aspect includes receiving a first mobility management message at a core network from a UE. This mobility management message may include, for example, a request to attach to the packet-switched domain, perform a routing area update or receive a packet-switched service. The core network includes a packet-switched domain and a circuit-switched domain, and the first mobility management message is received at the packet-switched domain component. The method also includes detecting congestion in the core network; and in response thereto, causing transmission of a rejection message from the packet-switched domain component to the UE in response to receipt of the first mobility management message.

The rejection message indicates congestion as a cause for rejection of the first mobility management message, and may also include a value of the back-off timer. Consequently, receipt of the rejection message at the UE causes the UE to run a back-off timer (e.g., starting at the back-off timer value) indicating a time during which the UE defers transmission of any further mobility management messages to the packet-switched domain component. Further, the rejection message indicates whether circuit-switched services are permitted or forbidden during running of the back-off timer. And in an instance in which the rejection message indicates that circuit-switched services are permitted, receipt of the rejection message at the UE causes the UE to transmit a second mobility management message from the UE to a component of the circuit-switched domain (e.g., MSC) while the back-off timer is running.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used in this application, the term "circuitry" refers to any or all of the following: (a) hardware-only circuit implementations (such as implementations in only analog and/or digital circuitry); (b) combinations of circuits and software (and/or firmware), such as (as applicable): (i) a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Figure 1:
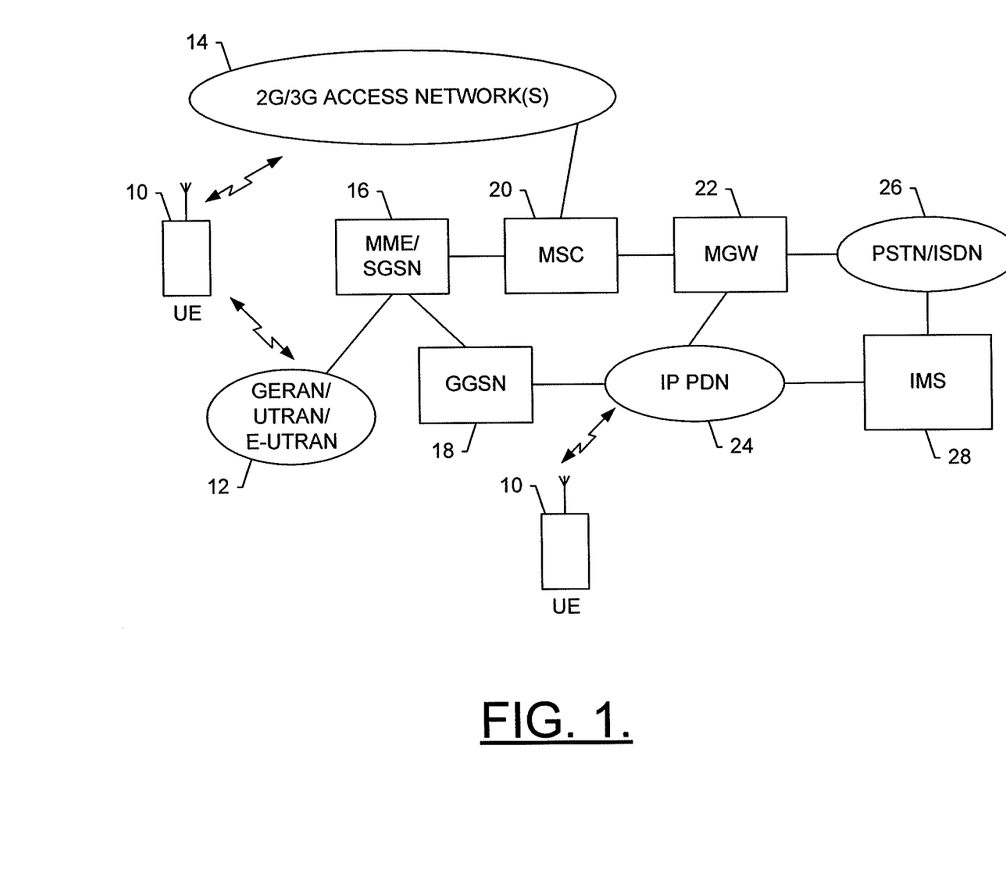
FIG. 1 illustrates one example of a communication system according to an example embodiment of the present invention.

FIG. 1 illustrates a generic system diagram in which a device such as user equipment (UE) 10 or other mobile terminal is shown in an example communication environment in which embodiments of the present invention may be employed. As shown, the system includes one or more radio access networks (RANs) that provide an air interface between a UE and one or more core networks of appropriate operators. These core networks, in turn, may provide network services such as packet-switched services and/or circuit-switched services to users via one or more external networks.

The system may include a number of different RANs including one or more GSM/Edge Radio Access Networks (GERANs), Universal Terrestrial Radio Access Networks (UTRANs), Evolved UTRANs (E-UTRANs) 12 or the like, and/or one or more other second generation (2G), third generation (3G) radio access networks 14 or the like. These RANs may include one or more base stations, node Bs, evolved node Bs (0) or the like (generally a "base site"), each of which may have a coverage area that defines a region within which UEs 10 may utilize the respective base sites to access the core network(s). The RANs may also include one or more base station controllers (BSCs), radio network controllers (RNCs) that control communication to and from groups of base sites.

The core network(s) may include a packet-switched domain for providing packet-switched services to users, and/or a circuit-switched domain for providing circuit-switched services to users. The packet-switched domain may include components such as a Mobility Management Entity (MME) 16, Serving GPRS Support Node—SGSN (shown integrated into the same components), Gateway GPRS Support Node—GGSN 18 or the like, which in one example, may form part of the Evolved Packet Core (EPC) of the System Architecture Evolution (SAE). The circuit-switched domain may include components such as a Mobile Switching Center (MSC) 20, Media Gateway (MGW) 22 or the like. These packet-switched components, circuit-switched components and other components may be configured to route calls, data or the like to and from the UEs via the respective RANs. The GGSN, MGW and/or UE may be coupled to one or more data or Internet Protocol (IP) packet data networks (PDNs) 24, such as one or more local area networks, wide area networks (for example, the Internet) or the like. In various example embodiments, a particular GGSN by which a UE accesses a PDN may be referred to by its access point name (APN), and the respective UE may be considered to have a subscription to the APN.

The MGW 22 of the circuit-switched domain may be coupled to one or more circuit-switched networks 26 such as a public switched telephone network (PSTN), integrated services digital network (ISDN) or the like. The PDN 24 and PSTN/IDDN may be coupled to a 3rd Generation Partnership Program (3GPP) IP Multimedia Subsystem (IMS) 28. Generally, the packet-switched components, circuit-switched components and other components of the system may include one or more processors that may define processing circuitry either alone or in combination with one or more memories that may store instructions that, when executed by the one or more processors, cause the respective components to perform corresponding functions as described herein.

The core network(s) may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the core network(s). In some example embodiments, the core network(s) may employ one or more mobile access mechanisms such as wideband code division multiple access (W-CDMA), CDMA2000, global system for mobile communications (GSM), general packet radio service (GPRS), long term evolution (LTE), LTE Advanced (LTE-A) or the like.

One or more UEs 10 may be configured to communicate with one other or other devices via the core network(s). In some cases, each of the UEs may include an antenna or antennas for transmitting signals to and for receiving signals from a base site of a RAN. In turn, other devices such as processing devices (e.g., personal computers, server computers or the like) may be coupled to the UE via the core network(s). In 3GPP, for example, the UEs may be operable in one of three modes. In a mode A, the UE may be simultaneously attached to both packet-switched domain (e.g., GPRS) and circuit-switched domain (e.g., GSM), and may support simultaneous operation of services from both domains. In a mode B, the UE may be simultaneously attached to both packet-switched domain (e.g., GPRS) and circuit-switched domain (e.g., GSM), but may only support operation of services from one domain at a time. And in a mode C, the UE may only support attachment to and receive services from the packet-switched domain (e.g., GPRS).

In some example embodiments, the UE 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the UE may include one or more processors that may define processing circuitry either alone or in combination with one or more memories. The processing circuitry may utilize instructions stored in the memory to cause the UE to operate in a particular way or execute specific functionality when the instructions are executed by the one or more processors. The UE may also include communication circuitry and corresponding hardware/software to enable communication with other devices (and/or the core network(s) via the base site of a RAN).

The MME 16 may include one or more processors that may define processing circuitry either alone or in combination with one or more memories that may store instructions that, when executed by the one or more processors, cause the MME to perform corresponding functions as described herein. In an example embodiment, the MME may be configured to function as a control node responsible for, among other things, tracking and paging and providing control plane functions for mobility between RANs. The MME may also have involvement in bearer activation and/or deactivation and handling handover functions.

Figure 2:
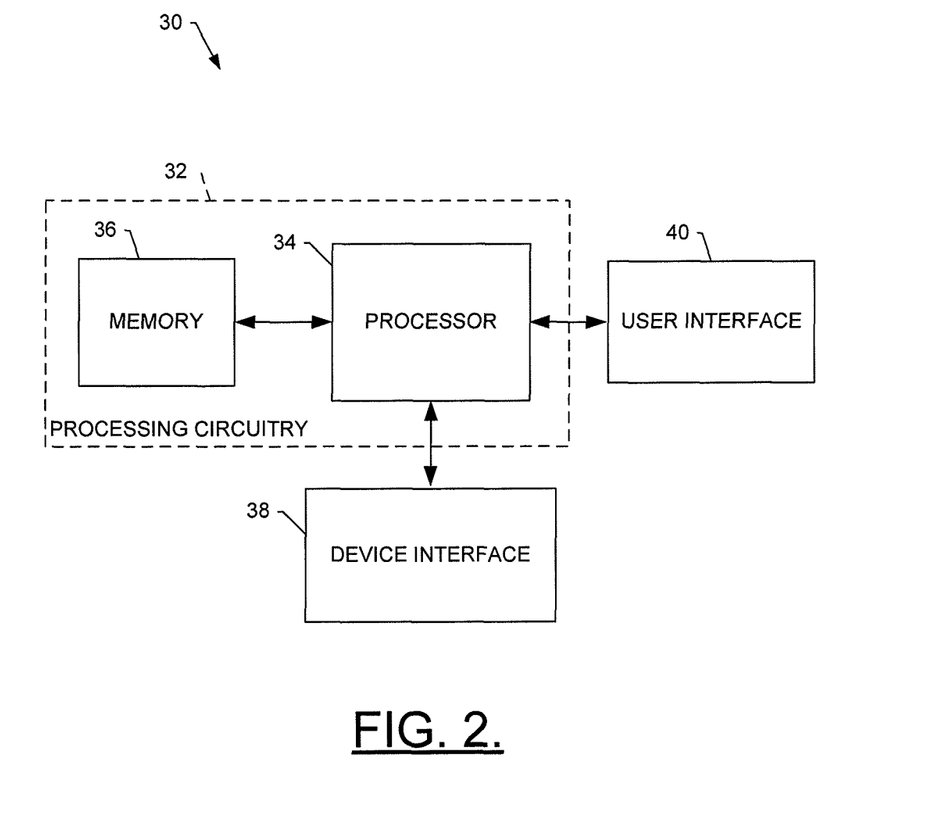
FIG. 2 illustrates a block diagram showing an apparatus in accordance with an example embodiment of the present invention.

In an example embodiment, components of the system of FIG. 1 may include or otherwise employ an apparatus configured according to an example embodiment of the present invention. FIG. 2 illustrates a schematic block diagram of such an apparatus that may be configured to function as one or more of the components of the system, such as a UE 10, MME 16 or SGSN, according to an example embodiment of the present invention. Although shown as separate or integrated components, in some exemplary embodiments, integrated components may be supported by separate apparatuses (e.g., separate MME and SGSN), or separate components may be supported by a single apparatus. An example embodiment of the invention will now be described with reference to FIG. 2, in which certain elements of an apparatus 30 are displayed. It should be noted, however, that the components, devices or elements described below may not be mandatory and thus some may be omitted in certain embodiments. Additionally, some embodiments may include further or different components, devices or elements beyond those shown and described herein.

As shown, the apparatus 30 may include or otherwise be in communication with processing circuitry 32 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may include one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 32 may include a processor 34 and memory 36 that may be in communication with or otherwise control a device interface 38 and, in some cases, a user interface 40. As such, the processing circuitry may be embodied as a circuit chip (e.g., an integrated circuit chip) configured to (e.g., with hardware, alone or in combination with software) perform operations described herein. However, in some embodiments, the processing circuitry may be embodied as a portion of a server, computer, workstation or other fixed or mobile computing device. In situations where the processing circuitry is embodied as a server or at a remotely located computing device, the user interface may be disposed at another device (e.g., at a computer terminal or client device) that may be in communication with the processing circuitry via the device interface and/or a network.

The processor 34 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 36 or otherwise accessible to the processor. As such, whether configured by hardware or by a combination of hardware and software, the processor may represent an entity (e.g., physically embodied in circuitry—in the form of processing circuitry 32) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In an exemplary embodiment, the memory 36 may include one or more non-transitory memory devices such as, for example, volatile and/or non-volatile memory that may be either fixed or removable. The memory may be configured to store information, data, applications, instructions or the like for enabling the apparatus 30 to carry out various functions in accordance with exemplary embodiments of the present invention. For example, the memory could be configured to buffer input data for processing by the processor 34. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The device interface 38 may include one or more interface mechanisms for enabling communication with other devices and/or networks. In some cases, the device interface may be any means such as a device or circuitry embodied in either hardware, or a combination of hardware and software that is configured to receive and/or transmit data from/to a network and/or any other device or module in communication with the processing circuitry 32. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

The user interface 40 (if implemented) may be in communication with the processing circuitry 32 to receive an indication of a user input at the user interface and/or to provide an audible, visual, mechanical or other output to the user. The user interface may include, for example, a keyboard, a mouse, a joystick, a display, a touch screen, a microphone, a speaker, and/or other input/output mechanisms. The user interface may also include user interface circuitry and user interface software configured to facilitate user control of at least some functions of the apparatus through use of a display. In an exemplary embodiment in which the apparatus is embodied at a server or other network device (e.g., the MME 16), the user interface may be fully implemented, limited, remotely located or eliminated.

Returning to FIG. 1, the UE 10 and core network including the MME 16 may communicate with one another in accordance with a protocol stack including a number of functional layers that support signaling and traffic between the respective elements. These layers may include, for example, an access stratum (AS) that may be akin to a link layer and function as a carrier or transport for a non-access stratum (NAS) that may be akin to a network layer. A number of the functions of the MME form part of the NAS, such as radio resource (RR) management, mobility management (MM) and connection management (CM) procedures—each of which may be characterized by a sublayer of the NAS. More information on these and other sublayers of the NAS of one example may be found in 3GPP TS 24.007.

Mobility management may be viewed in terms of different mobility states of a UE 10, including for example, detached, active and idle. In the detached state, the UE may be powered off or powered on but in the process of searching for and attaching to or otherwise registering with a core network (e.g., International Mobile Subscriber Identity (IMSI) attach). In the active state, the UE may be attached to a core network (e.g., IMSI attached) and have a radio resource control (RRC) connection with a RAN. In the active state, the RAN and/or core network may store a UE context that includes subscription information for the UE, and the core network and UE may be able to exchange data. The idle state is a power-conservation state for the UE, where the UE typically does not transmit or receive packets. In the idle state, the UE may not have a RRC connection with a RAN. In the active state, the core network may locate the UE in a RAN on the level of a cell served by one or more of its base sites; but in the idle state, the core network may only locate the UE on the level of groups of multiple cells (known at times as a location area, routing area or tracking area), and the core network. In the idle state, the core network must therefore page a UE to locate it to a particular cell.

MM procedures may be performed after a RR (RRC) connection has been established between a UE 10 and core network; and in the case a RR connection has not yet been established, the MM sublayer may initiate establishment of such a connection. The MM sublayer generally supports the mobility of UEs 10, such as informing the core network of its present location and providing user identity confidentiality; and it may provide connection management services to the CM sublayer. In 3GPP, for example, MM procedures may include procedures for non-GPRS services (at times referred to as MM procedures) and procedures for GPRS services (at times referred to as GMM procedures). Although more specifically referencing non-GPRS services in 3GPP, unless specified otherwise, MM procedures herein may refer procedures for non-GPRS services or procedures for GPRS services. More information on MM procedures in accordance with 3GPP may be found in 3GPP TS 24.008.

MM procedures may include those initiated by the UE 10 as well as those initiated by the core network. In one example embodiment, MM procedures initiated by the UE may include procedures to attach to or detach from the core network e.g., GPRS attach/detach), which may include establishing or releasing an appropriate UE context (e.g., GMM context). When a context has been established, UE-initiated MM procedures may also include a normal or periodic routing area update procedure. And the UE-initiated MM procedures may include a service request procedure to establish a secure connection to the network and/or to request the resource reservation for sending data.

In one example embodiment, the core network (e.g., SGSN 16) may detect network congestion (e.g., GMM signaling congestion, NAS signaling congestion, lack of processing resources) and perform congestion control (e.g., NAS-level congestion control) in mobility management. In one example, this congestion control may include general mobility management control and subscribed APN-based congestion control. When the core network is under general overload conditions, it may reject mobility management signaling requests from UEs 10. And when subscribed APN-based congestion control is active for a particular GGSN 18, the network may reject mobility management messages from UEs subscribed to the APN of the particular GGSN.

The core network may receive a MM message from a UE 10. This message may take the form of a request message such as a request to attach to the packet-switched domain (e.g., ATTACH REQUEST), perform a routing area update (e.g., ROUTING AREA UPDATE REQUEST) or receive a packet-switched service (e.g., SERVICE REQUEST). In an instance in which the network detects congestion, the network may respond to the UE message with a rejection message such as ATTACH REJECT, ROUTING AREA UPDATE REJECT or SERVICE REJECT. This rejection message may indicate congestion as the cause for the rejection (e.g., cause value #22), and include a back-off timer (e.g., T3346) value— although the UE may be pre-configured or programmed with a back-off timer value. The UE may start a back-off timer with this received value, and defer transmitting any further MM messages to the network until expiration of the back-off timer. The UE may thereafter again send the network MM messages, such as to reinitiate its previous request.

In various instances, it may be the case that the core network detects congestion in the packet-switched domain, but the circuit-switched domain has sufficient resources to provide circuit-switched services to the UE 10. For example, while the SGSN 16 in the packet-switched domain may detect congestion in the packet-switched domain, the MSC 20 in the circuit-switched domain may have sufficient resources to provide circuit-switched services. Example embodiments of the present invention therefore permit a UE to request and receive circuit-switched services in various instances in which the UE is subject to congestion control from the packet-switched domain. In one example, the core network may explicitly indicate to the UE whether circuit-switched services are permitted or forbidden as congestion control is imposed for packet-switched services and the back-off timer is running.

In a more particular example, a GPRS UE 10 operating in operation modes A or B that is not yet IMSI attached for circuit-switched services in the network may perform an IMSI attach for non-GPRS services while the back-off timer is running and proceed with appropriate circuit-switched MM procedures such as on request of upper layers. In another example, a GPRS UE operating in operation modes A or B that is already IMSI attached for circuit-switched services in the network may remain IMSI attached for circuit-switched services in the network. The UE of this other example may proceed with the appropriate MM procedure according to the MM service state while the back-off timer is running, and proceed with appropriate circuit-switched procedures such as on request of upper layers.

Figure 3:
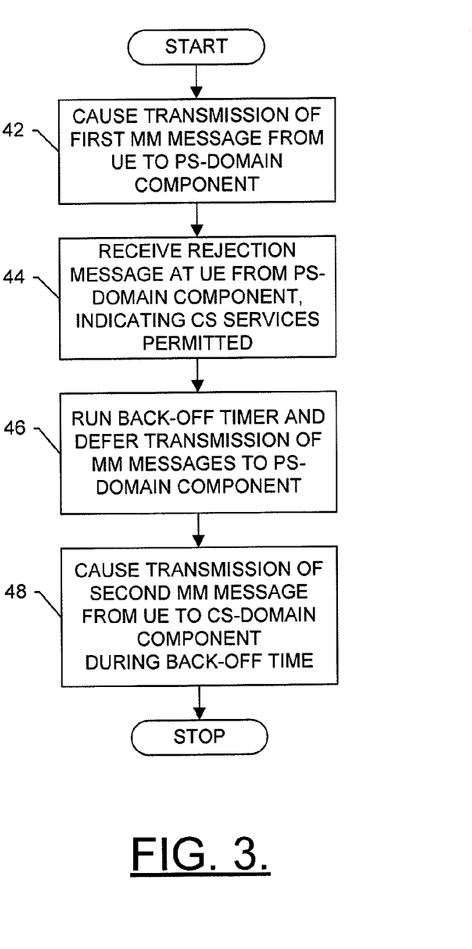
FIGS. 3 and 4 are flowcharts illustrating various operations in methods according to example embodiments of the present invention.
Figure 4:
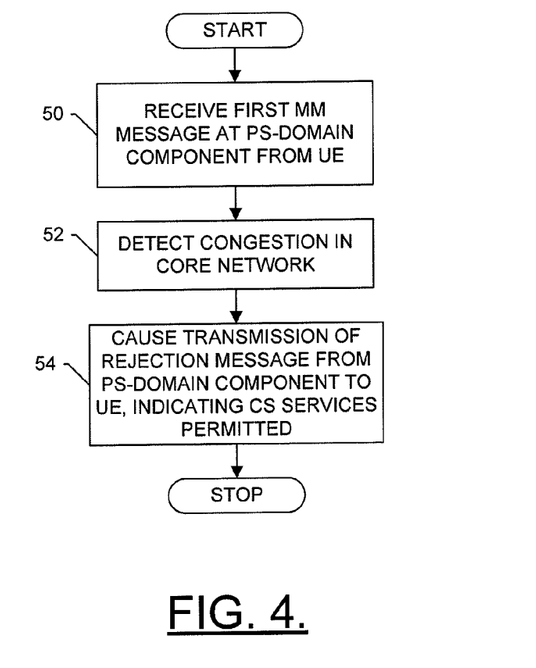

FIGS. 3 and 4 are flowcharts of a system, method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts block(s). These computer program instructions may also be stored in a non-transitory computer-readable storage memory that may direct a computer or other programmable apparatus to function in a particular manner, such that the instructions stored in the computer-readable storage memory produce an article of manufacture the execution of which implements the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 3 illustrates various operations in a method according to example embodiments of the present invention from the perspective of a UE 10. As shown at operation 42, the method includes causing transmission of a first mobility management message from a UE to a core network including a packet-switched (PS) domain and a circuit-switched (CS) domain. In this regard, the method may include causing transmission of the first mobility management message to a component (e.g., MME/SGSN 16) of the packet-switched domain. This mobility management message may include, for example, a request to attach to the packet-switched domain, perform a routing area update or receive a packet-switched service.

As shown at operation 44, the method may also include receiving a rejection message at the UE 10 from the packet-switched domain component (e.g., MME/SGSN 16) in response to the first mobility management message. The rejection message indicates congestion as a cause for rejection of the first mobility management message, and may also include a value of the back-off timer. Consequently, the method may include running a back-off timer (e.g., starting at the back-off timer value) in response to receipt of the rejection message, as shown at operation 46. The back-off timer in this example indicates a time during which the UE defers transmission of any further mobility management messages to the packet-switched domain component (e.g., MME/SGSN 16).

While the back-off timer is running, the method includes causing transmission of a second mobility management message from the UE 10 to a component of the circuit-switched domain (e.g., MSC 20), as shown at operation 48. In one example, the rejection message may include an indication whether circuit-switched services are permitted or forbidden during running of the back-off timer. In this example, transmission of the second mobility management message may be caused in an instance in which the rejection message indicates that circuit-switched services are permitted.

FIG. 4 illustrates various operations in a method according to example embodiments of the present invention from the perspective of a packet-switched domain component (e.g., MME/SGSN 16). As shown at operation 50, the method includes receiving a first mobility management message at a core network from a UE 10. This mobility management message may include, for example, a request to attach to the packet-switched domain, perform a routing area update or receive a packet-switched service. The core network includes a packet-switched domain and a circuit-switched domain, and the first mobility management message is received at the packet-switched domain component. The method also includes detecting congestion in the core network; and in response thereto, causing transmission of a rejection message from the packet-switched domain component to the UE in response to receipt of the first mobility management message, as shown in blocks 52 and 54.

The rejection message indicates congestion as a cause for rejection of the first mobility management message, and may also include a value of the back-off timer. Consequently, receipt of the rejection message at the UE 10 causes the UE to run a back-off timer (e.g., starting at the back-off timer value) indicating a time during which the UE defers transmission of any further mobility management messages to the packet-switched domain component. Further, the rejection message indicates whether circuit-switched services are permitted or forbidden during running of the back-off timer. And in an instance in which the rejection message indicates that circuit-switched services are permitted, receipt of the rejection message at the UE causes the UE to transmit a second mobility management message from the UE to a component of the circuit-switched domain (e.g., MSC 20) while the back-off timer is running.

In various example embodiments, an apparatus for performing the method of FIG. 3 or FIG. 4 above may include processing circuitry (e.g., processing circuitry 32) configured to perform some or each of the operations (42-48 or 50-54) described above, with or without some or all of the modifications described above. The processing circuitry may, for example, be configured to perform the respective operations by performing hardware implemented logical functions, executing stored instructions or executing algorithms for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. Apparatus for enabling circuit-switched services, the apparatus comprising:
    a processing system arranged to cause the apparatus at least:
    to cause transmission of a first mobility management message from user equipment to a core network that includes a packet-switched domain and a circuit-switched domain, such that a said first mobility management message is transmitted to a component of said packet-switched domain, the user equipment being arranged to receive a rejection message from said packet-switched domain component in response to the first mobility management message, the rejection message indicating congestion as a cause for rejection of the first mobility management message, and indicating whether circuit-switched services are permitted during running of a back-off timer; and
    to cause the back-off timer to run in response to receipt of the rejection message, the back-off timer indicating a time during which the user equipment defers transmission of any further mobility management messages to the packet-switched domain component;
    wherein the indication in the rejection message that circuit-switched services are permitted enables the apparatus to cause transmission of a second mobility management message from the user equipment to a component of the circuit-switched domain, while the back-off timer is running.

2. The apparatus according to claim 1, wherein said rejection message includes a value of the back-off timer, the apparatus being caused to run the back-off timer starting with the value.

3. The apparatus according to claim 1, the processor system being arranged to cause the apparatus to:
    cause transmission of the second mobility management message from the user equipment to a said component of the circuit-switched domain in an instance in which the rejection message indicates that circuit-switched services are permitted, and while the back-off timer is running.

4. The apparatus according to claim 3, the apparatus being arranged such that transmission of the first mobility management message includes transmission of at least one of: a request to attach to the packet-switched domain, perform a routing area update and receive a packet-switched service.

5. The apparatus according to claim 1, wherein the processing system comprises at least one processor and at least one memory device of a mobile phone, the at least one processor being directly or indirectly connected to one or more other components of the mobile phone.

6. The apparatus according to claim 5, wherein the one or more other components of the mobile phone include:
    user interface circuitry; and
    user interface software configured to facilitate user control of at least some functions of the mobile phone through use of a display.

7. Apparatus for enabling circuit-switched services, the apparatus comprising:
    a processing system arranged to cause the apparatus at least:
    to be capable of receiving a first mobility management message at a core network from user equipment, the core network including a packet-switched domain and a circuit-switched domain, the first mobility management message being receivable at a component of the packet-switched domain;
    to detect congestion in the core network, and in response thereto:
    to cause transmission of a rejection message from the packet-switched domain component to said user equipment in response to receipt of the first mobility management message, the rejection message indicating congestion as a cause for rejection of the first mobility management message;
    wherein receipt of the rejection message at said user equipment causes the user equipment to run a back-off timer indicating a time during which the user equipment defers transmission of any further mobility management messages to the packet-switched domain component,
    wherein the rejection message further indicates whether circuit-switched services are permitted during running of the back-off timer, and
    wherein in an instance in which the rejection message indicates that circuit-switched services are permitted, receipt of the rejection message at said user equipment enables the user equipment to transmit a second mobility management message from the user equipment to a component of the circuit-switched domain while the back-off timer is running.

8. The apparatus according to claim 7, the apparatus being arranged such that said rejection message includes a value of the back-off timer, receipt of the rejection message at the user equipment causing the user equipment to run the back-off timer starting with the value.

9. The apparatus according to claim 7, wherein the apparatus is arranged such that the first mobility management message received at said core network can include at least one of: a request to attach to the packet-switched domain, perform a routing area update and receive a packet-switched service.

10. A method for enabling circuit-switched services, the method comprising:
    causing transmission of a first mobility management message from user equipment to a core network that includes a packet-switched domain and a circuit-switched domain, wherein the first mobility management message is transmitted to a component of the packet-switched domain;
    receiving a rejection message at the user equipment from the packet-switched domain component in response to the first mobility management message, the rejection message indicating congestion as a cause for rejection of the first mobility management message, and indicating whether circuit-switched services are permitted during running of a back-off timer; and running the back-off timer in response to receipt of the rejection message, the back-off timer indicating a time during which the user equipment defers transmission of any further mobility management messages to the packet-switched domain component;

wherein the indication in the rejection message that circuit-switched services are permitted enables the user equipment to transmit a second mobility management message to a component of the circuit-switched domain while the back-off timer is running.

11. The method according to claim 10, wherein the rejection message includes a value of the back-off timer, and wherein running the back-off timer includes running the back-off timer starting with the value.

12. The method according to claim 10, comprising:

transmitting a said second mobility management message from the user equipment to the component of the circuit-switched domain in an instance in which the rejection message indicates that circuit-switched services are permitted and while the back-off timer is running.

13. The method according to claim 10, wherein the first mobility management message includes at least one of: a request to attach to the packet-switched domain, perform a routing area update and receive a packet-switched service.

14. A method for enabling circuit-switched services, the method comprising:

receiving a first mobility management message at a core network from user equipment, the core network including a packet-switched domain and a circuit-switched domain, the first mobility management message being received at a component of the packet-switched domain;

detecting congestion in the core network, and in response thereto, causing transmission of a rejection message from the packet-switched domain component to the user equipment in response to receipt of the first mobility management message, the rejection message indicating congestion as a cause for rejection of the first mobility management message, wherein receipt of the rejection message at the user equipment causes the user equipment to run a back-off timer indicating a time during which the user equipment defers transmission of any further mobility management messages to the packet-switched domain component, wherein the rejection message further indicates whether circuit-switched services are permitted during running of the back-off timer, wherein in an instance in which the rejection message indicates that circuit-switched services are permitted, receipt of the rejection message at the user equipment enables the user equipment to transmit a second mobility management message from the user equipment to a component of the circuit-switched domain while the back-off timer is running.

15. The method according to claim 14, wherein the rejection message includes a value of the back-off timer, and wherein receipt of the rejection message at the user equipment causes the user equipment to run the back-off timer starting with the value.

16. The method according to claim 14, wherein the first mobility management message includes at least one of a request to attach to the packet-switched domain, perform a routing area update and receive a packet-switched service.

17. A non-transitory computer readable medium comprising a set of instructions, which, when executed by a processing system, cause the processing system to cause an apparatus:

to cause transmission of a first mobility management message from user equipment to a core network that includes a packet-switched domain and a circuit-switched domain, such that said first mobility management message is transmitted to a component of said packet-switched domain, the user equipment being arranged to receive a rejection message from said packet-switched domain component in response to the first mobility management message, the rejection message indicating congestion as a cause for rejection of the first mobility management message, and indicating whether circuit-switched services are permitted during running of a back-off timer; and to cause the back-off timer to run in response to receipt of the rejection message, the back-off timer indicating a time during which the user equipment defers transmission of any further mobility management messages to the packet-switched domain component;

wherein the indication in the rejection message that circuit-switched services are permitted enables the apparatus to cause transmission of a second mobility management message from the user equipment to a component of the circuit-switched domain, while the back-off timer is running.

18. The non-transitory computer readable medium according to claim 17, wherein said rejection message includes a value of the back-off timer, the instructions being such that the apparatus is caused to run the back-off timer starting with the value.

19. The non-transitory computer readable medium according to claim 17, the instructions being such that the processor system causes the apparatus to:

cause transmission of the second mobility management message from said user equipment to said component of the circuit-switched domain in an instance in which the rejection message indicates that circuit-switched services are permitted, and while the back-off timer is running.

20. The non-transitory computer readable medium according to claim 19, the instructions being such that transmission of the first mobility management message includes transmission of at least one of: a request to attach to the packet-switched domain, perform a routing area update and receive a packet-switched service.

21. The non-transitory computer readable medium according to claim 17, wherein the processing system comprises at least one processor and at least one memory device of a mobile phone, the at least one processor being directly or indirectly connected to one or more other components of the mobile phone.

22. The non-transitory computer readable medium according to claim 21, wherein the one or more other components of the mobile phone include:

user interface circuitry; and user interface software configured to facilitate user control of at least some functions of the mobile phone through use of a display.

23. The non-transitory computer readable medium comprising a set of instructions, which, when executed by a processing system, cause the processing system to cause an apparatus:

to be capable of receiving a first mobility management message at a core network from user equipment, the core network including a packet-switched domain and a circuit-switched domain, the first mobility management message being receivable at a component of the packet-switched domain;

to detect congestion in the core network, and in response thereto:

to cause transmission of a rejection message from the packet-switched domain component to said user equipment in response to receipt of the first mobility management message, the rejection message indicating congestion as a cause for rejection of the first mobility management message;

wherein receipt of the rejection message at said user equipment causes the user equipment to run a back-off timer indicating a time during which the user equipment defers transmission of any further mobility management messages to the packet-switched domain component, wherein the rejection message further indicates whether circuit-switched services are permitted during running of the back-off timer, and wherein in an instance in which the rejection message indicates that circuit-switched services are permitted, receipt of the rejection message at said user equipment enables the user equipment to transmit a second mobility management message from the user equipment to a component of the circuit-switched domain while the back-off timer is running.

24. The non-transitory computer readable medium according to claim 23, the instructions being such that said rejection message includes a value of the back-off timer, receipt of the rejection message at the user equipment causing the user equipment to run the back-off timer starting with the value.

25. The apparatus according to claim 23, the instructions being such that the apparatus is arranged such that the first mobility management message received at said core network can include at least one of: a request to attach to the packet-switched domain, perform a routing area update and receive a packet-switched service.

* * * * *